Oct. 31, 1972     D. TREBITZ ET AL     3,701,588
REPRODUCTION LENS OF HIGH IMAGE-RESOLVING POWER WITH AN
IMAGE-SIDE NUMERICAL APERTURE OF 0.5 COMPRISING
THREE DOUBLETS AND THREE SINGLE LENS ELEMENTS
Filed March 18, 1971
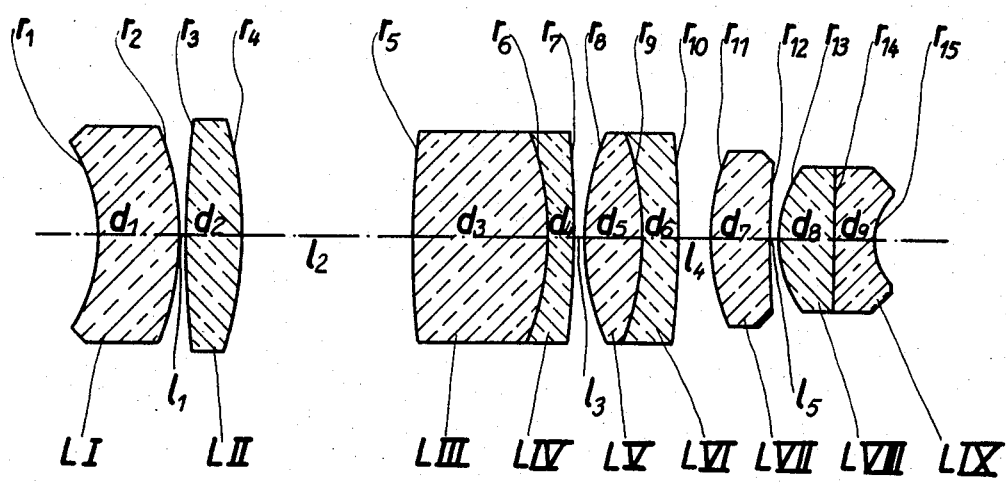
INVENTORS
Doris Trebitz
Ernst Rumpolden

United States Patent Office 3,701,588
Patented Oct. 31, 1972

3,701,588
REPRODUCTION LENS OF HIGH IMAGE-RESOLVING POWER WITH AN IMAGE-SIDE NUMERICAL APERTURE OF 0.5 COMPRISING THREE DOUBLETS AND THREE SINGLE LENS ELEMENTS
Doris Trebitz, Jena, and Ernst Rumpoldin, Apolda, Germany, assignors to Jenoptik Jena G.m.b.H., Jena District of Gera, Germany
Filed Mar. 18, 1971, Ser. No. 84,469
Int. Cl. G02b 9/62
U.S. Cl. 350—215                             1 Claim

ABSTRACT OF THE DISCLOSURE

A reproduction lens of high image-resolving power comprises three doublets and three single lens elements, I, II, III/IV, V/VI, VII, VIII/IX from object side to image side, and is divided into three groups. The first group consists of the elements I and II, I being a dispersive meniscus, and II being a convergent element. The second group consists of the two cemented convergent doublets III/VI and V/VI, whereof the single elements III and V are convergent and the single elements IV and VI are divergent. The third group consists of the convergent element VII and the cemented thick meniscus VIII/IX. The lens aperture is 0.5. The focal length of the lens is 15 mm. The image scale is 1:15. The lens is suitable for microphotographic techniques and micro-wave circuits.

---

This invention relates to a reproduction lens of high image-resolving power with an image-side numerical aperture of 0.5 comprising three doublets and three single lens elements.

For the sake of clarity the doublets are hereinafter designated III/IV, V/VI and VIII/IX, and the single elements I, II, and VII, from front to rear, i.e. from object side to image side. The doublets and the single elements are arranged in three groups as follows: a dispersive meniscus I having its concave face to the object side and a convergent lens II whose curvature of smaller radius is to the image-side, making up the first group, followed by the second group, comprising the doublets III/IV and V/VI either of them being convergent cemented lenses, each of the doublets consisting of a convergent lens component III and V, respectively, and a divergent lens IV and VI respectively, and a third group on the rear, being made up of a convergent lens component VII whose curvature of smaller radius is to the object side, and the cemented doublet VIII/IX, being a thick meniscus, the concave face of which is to the image-side.

Known lenses of this kind, being specially applied in reproduction which requires extremely high image-resolving powers, do not obtain an image-side numerical aperture of 0.5. Besides some of these lenses have a high negative distortion. According to the laws of diffraction a faultlessly imaging lens has a theoretical image-resolving power defined by $$R_G = \frac{A}{0.61\lambda}$$

in which A is the image-side numerical aperture, $\lambda$ the wave-length of the respective light being applied, and $R_G$ is the image-resolving power.

With a constant wave-length of light the image-resolving power increases proportionally to the increase in numerical aperture. However, it has to be considered that in the photographic reproduction process a small decrease in the image-resolving power will occur which is caused by contrast reduction of the photo-sensitive layers.

The present invention aims at providing a reproduction lens of the foregoing kind by means of which the theorectical image-resolving power is obtained up to an image diameter of 0.144 $f$ for the individual image points having, for instance with a focal length of $f=15$ mm., an image-side numerical aperture of 0.5, an image-scale of 1:15, using a basic wave-length of light of $\lambda=546$ nm., within a spectral width of tape of 50 nm. The relative distortion up to the image diameter of 0.144 $f$ is kept below 1 percent which qualifies the lens for microphotographic techniques and micro-switch circuits.

In order to obtain these objects the image errors have to be corrected in a manner that errors in asymmetry, the curavture of the image-field, the residual errors in aperture and astigmatism are kept to so small a tolerance as not to influence the theoretical possible image-resolving power of a faultlessly imaging system. The definition brightness by Strehl decides whether remaining picture errors are within an admittable tolerance. The picture errors are without any influence on the obtainable limit of the image-resolving power if the definition brightness for the individual picture points is above 0.8. The distortions which are generally without a definite influence on the image resolving power have to be kept to tolerances responding to the demand of similarity between image pattern and object pattern.

To this end the present invention consists of a reproduction lens of the foregoing kind, wherein the radius $r_9$ of the cemented face in the doublet V/VI is more than 1.55 $f$ and less than 1.85 $f$, the face belonging to said radius $r_9$ being concave to the object side, the difference of the refractive indices $n_{VLI}-n_{LV}$ relative to the wave-length $\lambda=546$ nm. of said cemented face lying between 0.14 and 0.18, and wherein the object side radius $r_1$ of the lens element 1 being more than 1.10 $f$ and less than 1.25 $f$, whilst the image side radius $r_{15}$ of the lens element IX being more than 0.35 $f$ and less than 0.55 $f$, where $f$ is the focal length of the whole lens system, and wherein the difference in the Abbe V number of the two cemented lens components in the doublet V/VI is more than 29 and less than 35 and the difference of the Abbe V numbers of the two cemented lens components in the doublets VIII/IX lies between 23.5 and 29.5. The selected radius $r'_9$ of the cemented face serves to correct the errors in aperture and to favourably influence the errors in asymmetry.

The given tolerances of the object side radius $r_1$ and of the image side radius $r_{15}$ help to flatten the curvature of the image-field for a relatively wide picture diameter.

The selected differences in the Abbe V numbers for the lens components of doublet V/VI and VIII/IX maintain the chromatical picture errors within a spectral band with of 50 nm. to such narrow limits that they do not influence the image-resolving power.

The correction of the chromatical picture errors can usefully be improved by adding a cemented face to the lens element I, said cemented face being concave to the object side.

The data of a preferred embodiment of lens according to the invention is given in the attached table. This embodiment is also illustrated diagrammatically and by way of example in the accompanying drawing.

The embodiment is corrected according to the given data, having an image-side numerical aperture of 0.5 with an image-scale of 1:15. The data given for the radii, the thicknesses and the distances are relative to the focal width $f=1$ of the whole lens, $n_e$ are the refractive indices of the respective glasses for a wave-length of light $\lambda=540$ nm., and $V_e$ are the Abbe numbers defined by the relation $$V_e = \frac{n_e - 1}{n_{F'} - n_{C'}}$$

in which $n_{F'}$ is the refractive index of the light, having a wave-length of $\lambda = 480$ nm., an $n_{C'}$ = the refractive index of light having the wave-length $\lambda = 644$ nm.

TABLE

[$f=1$  $\beta=-0.06727$  $A=0.5$]

| Lenses | Radii | Thicknesses and distances | $n_e$ | $V_e$ |
|---|---|---|---|---|
| $L_I$ | $r_1 = -1.1578h$ | $d_1 = 0.5324$ | 1.61114 | 45.9 |
|  | $r_2 = -2.2416$ | $l_1 = 0.0850$ |  |  |
| $L_{II}$ | $r_3 = +57.5647$ | $d_2 = 0.3568$ | 1.66885 | 35.6 |
|  | $r_4 = -3.0964$ | $l_2 = 1.1950$ |  |  |
| $L_{III}$ | $r_5 = +5.4843$ | $d_3 = 0.9458$ | 1.51824 | 63.8 |
| $L_{IV}$ | $r_6 = -2.0119$ | $d_4 = 0.1699$ | 1.74707 | 27.5 |
|  | $r_7 = -16.5578$ | $l_3 = 0.0170$ |  |  |
| $L_V$ | $r_8 = +1.7537$ | $d_5 = 0.4871$ | 1.51824 | 63.8 |
| $L_{VI}$ | $r_9 = -1.6946$ | $d_6 = 0.2322$ | 1.67784 | 32.0 |
|  | $r_{10} = -23.8120$ | $l_4 = 0.2322$ |  |  |
| $L_{VII}$ | $r_{11} = +1.3943$ | $d_7 = 0.4474$ | 1.62287 | 60.0 |
|  | $r_{12} = +23.6930$ | $l_5 = 0.0057$ |  |  |
| $L_{VIII}$ | $r_{13} = +0.7906$ | $d_8 = 0.3965$ | 1.62287 | 60.0 |
| $L_{IX}$ | $r_{14} = \infty$ | $d_9 = 0.3058$ | 1.65221 | 33.6 |
|  | $r_{15} = +0.4302$ |  |  |  |

The following tolerances are permitted:
Reciprocal value of the radii _____ $1/r \pm 0.05f$
Thicknesses of lens elements _____ $d \pm 0.05f$
Distances of lens elements _____ $1 \pm 0.05f$
Refractive indices _____ $n_e \pm 0.02$
Abbe $V_e$ numbers of the single lens elements and Abbe $V_e$ numbers of the doublets _____ $V_e \pm 2.0$ The magnitudes of these tolerances are such as to suit the manufacturing facilities of an optical workshop and they include the possible variations in the manufacture of optical glass and the resulting alterations of radii, thicknesses and air spaces.

We claim:
1. A reproduction lens of high image resolving power with an image-side numerical aperture of 0.5 comprising three doublets and three single lens elements, arranged in three groups, a dispersive meniscus I having its concave face to the object side and a convergent lens II whose curvature of smaller radius is to the image side, making up the first group, followed by the second group, comprising the doublets III/IV and V/VI, both of them being convergent cemented lenses, each of the doublets consisting of a convergent lens component III and V, respectively, and a divergent lens IV and VI, respectively, and a third group on the rear, being made up of a convergent lens component VII whose curvature of smaller radius is to the object side, and the cemented doublet VIII/IX, being a thick meniscus, the concave face of which is to the image side, characterized by the following features:

[$f=1$  $\beta=-0.06727$  $A=0.5$]

| Lenses | Radii | Thicknesses and distances | $n_e$ | $V_e$ |
|---|---|---|---|---|
| $L_I$ | $r_1 = -1.1578$ | $d_1 = 0.5324$ | 1.61114 | 45.9 |
|  | $r_2 = -2.2416$ | $l_1 = 0.0850$ |  |  |
| $L_{II}$ | $r_3 = +57.5647$ | $d_2 = 0.3568$ | 1.66885 | 35.6 |
|  | $r_4 = -3.0964$ | $l_2 = 1.1950$ |  |  |
| $L_{III}$ | $r_5 = +5.4843$ | $d_3 = 0.9458$ | 1.51824 | 63.8 |
| $L_{IV}$ | $r_6 = -2.0119$ | $d_4 = 0.1699$ | 1.74707 | 27.5 |
|  | $r_7 = -16.5578$ | $l_3 = 0.0170$ |  |  |
| $L_V$ | $r_8 = +1.7537$ | $d_5 = 0.4871$ | 1.51824 | 63.8 |
| $L_{VI}$ | $r_9 = -1.6946$ | $d_6 = 0.2322$ | 1.67784 | 32.0 |
|  | $r_{10} = -23.8120$ | $l_4 = 0.2322$ |  |  |
| $L_{VII}$ | $r_{11} = +1.3943$ | $d_7 = 0.4474$ | 1.62287 | 60.0 |
|  | $r_{12} = +23.6930$ | $l_5 = 0.0057$ |  |  |
| $L_{VIII}$ | $r_{13} = +0.7906$ | $d_8 = 0.3965$ | 1.62287 | 60.0 |
| $L_{IX}$ | $r_{14} = \infty$ | $d_9 = 0.3058$ | 1.65221 | 33.6 |
|  | $r_{15} = +0.4302$ |  |  |  | and further characterized by the following tolerances:
Reciprocal value of the radii _____ $1/r \pm 0.05f$.
Thicknesses of lens elements _____ $d \pm 0.05f$.
Distances of lens elements _____ $1 \pm 0.05f$.
Refractive indices _____ $n_e \pm 0.02$.
Abbe $V_e$ numbers of the single lens elements and Abbe $V_e$ numbers of the doublets _____ $V_e \pm 2.0$.

References Cited
UNITED STATES PATENTS 3,450,463  6/1969  Yasuda _____ 350—215 X
3,118,964  1/1964  Buzawa _____ 350—215 X JOHN K. CORBIN, Primary Examiner